United States Patent [19]

Sondergeld

[11] Patent Number: 4,779,236

[45] Date of Patent: Oct. 18, 1988

[54] ACOUSTIC WELL LOGGING METHOD AND SYSTEM

[75] Inventor: Carl H. Sondergeld, Broken Arrow, Okla.

[73] Assignee: Amoco Corporation, Chicago, Ill.

[21] Appl. No.: 891,495

[22] Filed: Jul. 28, 1986

[51] Int. Cl.$^4$ .............................................. G01V 1/40
[52] U.S. Cl. ....................................... 367/31; 367/75; 181/104
[58] Field of Search ....................... 367/31, 75; 73/152; 181/104, 105; 364/422

[56] References Cited

U.S. PATENT DOCUMENTS

| | | | |
|---|---|---|---|
| 3,127,950 | 4/1964 | Itria | 73/152 |
| 4,495,604 | 1/1985 | Dumanoir | 367/25 |
| 4,562,557 | 12/1985 | Parks et al. | 367/27 |
| 4,571,693 | 2/1986 | Birchak et al. | 364/422 |
| 4,575,830 | 3/1986 | Ingram et al. | 367/26 |
| 4,633,449 | 12/1986 | Ingram et al. | 367/75 |
| 4,661,933 | 4/1987 | Seeman et al. | 367/27 |
| 4,701,891 | 10/1987 | Castagna et al. | 367/31 |

OTHER PUBLICATIONS

Kimball et al., "Semblance Processing of Borehole Acoustic Array Data, "*Geophysics*, vol. 49, #3, 3/84.

Liu, O.Y., "Stoneley Wave-Derived Δt Shear Log," SPWLA 25th Annual Logging Symposium, 6/84.

Stevens et al., "Shear Velocity Logging in Slow Formations Using the Stoneley Wave, "*Geophysics*, vol. 51, #1, 1/86.

*Primary Examiner*—Thomas H. Tarcza
*Assistant Examiner*—Ian J. Lobo
*Attorney, Agent, or Firm*—Timothy D. Stanley

[57] ABSTRACT

A method and system for acoustic well logging for obtaining an indirect measure of shear wave velocities for earth formations surrounding a well borehole. The method and system relate to an indirect technique for inverting Stoneley wave velocity data to obtain an estimate of shear wave velocities of formations surrounding the borehole substantially concurrent with the logging operation. A subassembly adapted to be connected to an acoustic well logging sonde and form a part thereof provides measures of fluid density and velocity, and borehole radius as well as formation density and impedance. By combining the output of the well logging sonde and subassembly with the aid of a processor, one is able to obtain a measure of formation shear wave velocities, by constraining the inversion of measured Stoneley wave velocity data, substantially in real-time. This method is especially useful in slow formations where direct shear wave velocities cannot be obtained or where shear wave velocities are difficult to obtain.

9 Claims, 4 Drawing Sheets

ACOUSTIC WELL LOGGING METHOD AND SYSTEM

BACKGROUND OF THE INVENTION

The present invention relates generally to an acoustic well logging method and system for examining the earth's subsurface formations surrounding a borehole. More particularly, it relates to an improved method and system for acoustic well logging to obtain an indirect measure of the shear wave velocity of formations surrounding the borehole, especially in "slow" formations.

It is a well known practice to survey formations adjacent to and surrounding well boreholes by acoustic logging techniques in which acoustic signals are generated and received by means of a logging tool run through the well borehole. One acoustic well logging technique involves the generation and reception of pressure waves and the determination of the instant when the amplitude of the detected pressure wave exceeds a prescribed threshold. This technique generally depends upon the generation and reception of pressure waves and a determination of the traveltime of the pressure waves between the source and the receiver or between spaced receivers. The recorded time provides a measure of the compressional wave velocity in the earth's formation surrounding the borehole. A conventional well logging system generally includes a logging sonde suitable to be suspended in the borehole, a source with the sonde for generating pressure waves in the borehole fluid and one or more receivers with the sonde and spaced apart from the source for detecting pressure waves in the borehole fluid. The pressure waves in the borehole fluid generated by the source are refracted into the earth's formation surrounding the borehole. They then propagate through a portion of the formations, are refracted back into the borehole fluid at a point adjacent to the receivers and are then detected. The ratio of the distance between the source and receivers to the time between the generation and detection of the pressure wave can yield the compressional wave velocity of the formation.

Figure 1:
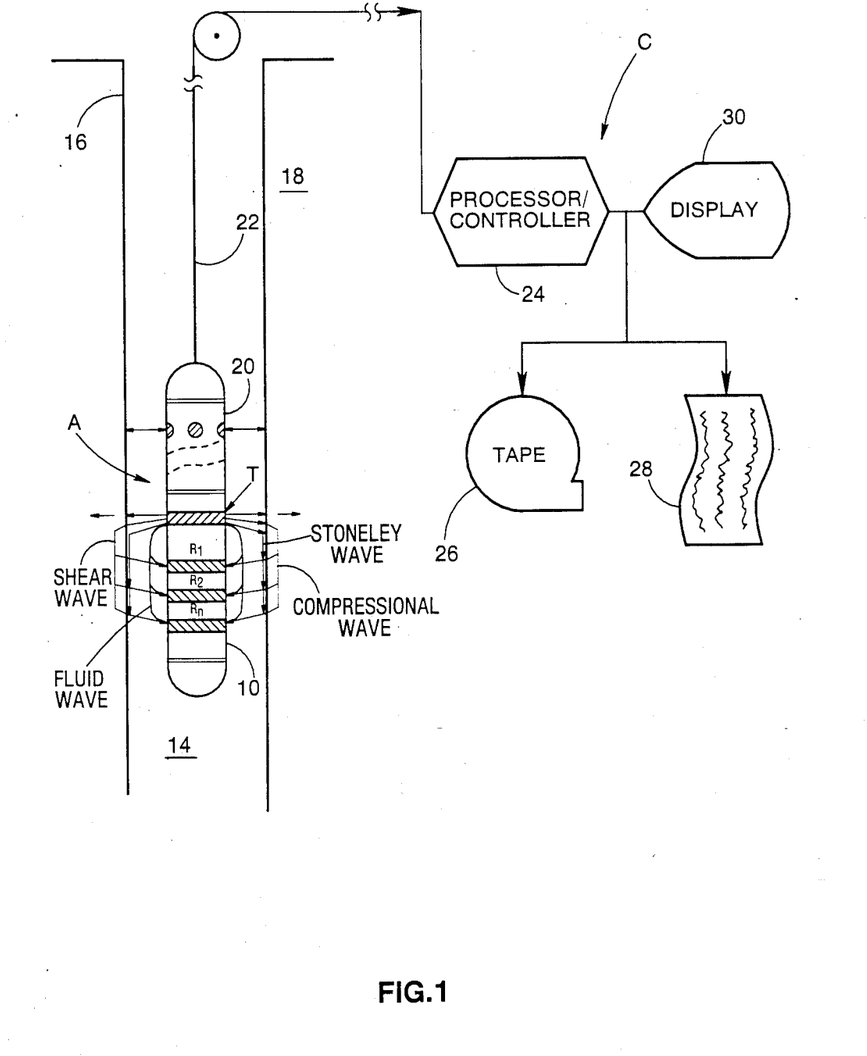
FIG. 1 is a partially schematic representation of the acoustic well logging system according to the present invention including an illustration of the various modes of propagation of acoustic energy imparted into a borehole.

With reference now to FIG. 1, when the pressure waves generated in the borehole fluid reach the borehole wall, they can produce refracted compressional waves in the surrounding earth formations as described above. In addition, the pressure waves can also produce a refracted shear waves in the surrounding earth formations, as well as guided waves, such as Stoneley waves, which travel partly in the borehole fluid and partly in a formation adjacent the borehole. Part of the shear waves are refracted back into the borehole fluid in the form of pressure waves which are detected by the receiver with the sonde. Guided waves are similarly detected by the receivers only delayed in time. In addition, part of the pressure waves never enter the formations but rather propagate in the borehole fluid as fluid waves directly to the receivers. The fluid waves generally travel at the velocity of sound in the borehole fluid but are of relatively low amplitudes and high frequencies, which can often be lost in the recorded signals. Any wave which is one of the four types of waves detected by the receivers can be called an arrival; the pressure wave in the borehole fluid which causes the refraction of compressional waves in the formations, the compressional wave arrival; those caused by refraction of the shear waves in the formation, the shear wave arrivals; those caused by guided waves, the guided wave arrivals; and those caused by fluid waves, the fluid wave arrivals. Thus, the signals generated by the receivers are composite signals which include the compressional wave arrivals, the shear wave arrivals, the guided wave arrivals, and the fluid wave arrivals. In earth formations, compressional waves travel faster than shear waves, and shear waves in a formation usually travel faster than the guided waves. Therefore, the composite signals generated by the receivers include the compressional wave arrivals as the first arrivals, the shear wave arrivals generally are the second arrivals, and the guided wave arrivals as the last arrivals. However, in certain situations refracted shear wave velocities are impossible or difficult to measure, for example, in "slow" formations where the shear wave velocities of the formations are less than or equal to the pressure wave velocity in the borehole fluid, or because the shear wave may not propagate through the formation.

In conventional pressure wave logging apparatus, the relative amplitudes of the refracted shear and compressional waves are such that it is difficult to distinguish the latter shear wave arrival from the earlier compressional wave arrival and from the reverberations of the borehole caused by the refraction of the pressure wave in the formation. Therefore, it is difficult to use conventional logging systems for logging shear wave velocities. More recently, full wavetrain acoustic well logging systems have been developed to obtain a measure of formation shear and compressional wave velocities as shown by Parks, et al., in U.S. Pat. No. 4,562,557 and Ingram, et al., in U.S. Pat. No. 4,575,830. Parks and Ingram describe a method for estimating or determining the velocities of various arrivals in composite signals recorded by a linear array of receivers. The method of determining or estimating velocities of these arrivals in the composite signals generally comprises the steps of generating acoustic energy in the borehole and recording a signal waveform representative of acoustic energy received at a plurality of points spaced vertically along the length of the borehole after refraction, reflection and direct transmission through and along the formations adjacent to the borehole. A window is established having a predetermined length and moveout. This window is positioned along the composite signal at estimated arrival times. The energy of the signal recorded in this window is multiplied at each point by the window. A Fourier transform of the multiplied energy is obtained to produce a plurality of complex signals in the frequency domain which are analyzed to obtain an estimate of the arrival velocities. The foregoing technique operates where the complex signal indeed includes shear wave arrivals. There are, however, other formation conditions that severely attenuate the propagation of the shear wave or instances where shear wave will not propagate. Hence, Ingram and others have suggested techniques for indirectly obtaining a measure of formation shear wave velocities from determined Stoneley wave velocities data. However, none of these techniqes actually determine measures of the formation and borehole fluid properties at selected locations of interest in the borehole during the course of logging necessary for constraining the inversion of the Stoneley wave velocity data to obtain formation shear wave velocities. Rather, these techniques depend on iterative methods using: lookup tables having ranges of anticipated parameters; estimated parameters; or measures of parameters obtained exterior from the borehole itself.

The present invention provides a solution to the need to obtain the measure of shear wave velocities in formations where it is difficult or impossible to obtain such measure directly. Specifically, the present invention provides an apparatus a method and system for obtaining a measure of formation and borehole fluid parameters at selected locations of interest in the borehole during the course of acoustic well logging so as to provide a more accurate indirect measure of shear wave velocities by inversion of Stoneley wave velocities and does so substantially concurrent with the acoustic well logging process.

SUMMARY OF THE INVENTION

The present invention relates generally to a method and system for acoustic well logging. More particularly, the present invention provides a method and system for constraining the inversion of Stoneley wave velocities to obtain indirect measures of shear wave velocities for earth formations surrounding the well borehole. The formation, borehole and borehole fluid parameters necessary to constrain the inversion of Stoneley wave velocity data can be obtained with a logging subassembly conrurrent with the acoustic well logging operation at selected locations within the borehole so as to provide more accurate estimates of shear wave velocity and can do so substantially in real-time.

Specifically, a first acoustic wave is generated at selected locations of interest within the borehole and signals representative of the receipt of the first acoustic wave at selected locations in the borehole after it has been refracted, reflected and transmitted through and along the formations adjacent the borehole are recorded. A measure of the formation compressional velocity and guided wave velocity at each of the selected locations in the borehole are determined from signals representative of the recorded first acoustic wave. Additionally, at each of the selected locations within the borehole, a second acoustic wave is generated and signals representative of the receipt of the second acoustic wave at each of selected locations in the borehole after transmission through the borehole fluid are recorded. A measure of the borehole fluid density and velocity are determined from the signals representative of the recorded second acoustic wave. Additionally, at each of the selected locations within the borehole, a third acoustic wave is generated and signals representative of the receipt of the third acoustic wave at each of the selected locations in the borehole are recorded after transmission through the borehole fluid and reflection from formations adjacent the borehole. A measure of the borehole radius is obtained from the signal representative of the recorded third acoustic wave and a measure of formation density can be obtained from the measures of formation compressional wave velocity, borehole fluid velocity and density, and borehole radius. Having determined borehole fluid velocity and density, borehole radius, formation density and compressional velocity, inversion of the Stoneley wave velocity data can be constrained to obtain a more accurate measure of the formation shear wave velocity. Other fea-, tures of the present invention will be apparent to those skilled in the art.

DETAILED DESCRIPTION OF THE PREFERRED EMBODIMENT

The method and system described herein can be used in conjunction with a wide variety of acoustic well logging tools. A diagram of an acoustic well logging system A is shown in FIG. 1. The acoustic well logging system A includes an acoustic well logging sonde 10 having have a transmitter T used to generate acoustic energy in the form of pressure waves in borehole fluid 14 within borehole 16 and refracted waves in and along formation 18 surrounding the borehole 16. A plurality of transducers, $R_1, R_2, \ldots, R_n$, are provided to record the reception of the pressure wave after propagating through the formation 18 and borehole fluid 14.

The sonde 10 can be rigid, flexible or simply a cable from which receivers $R_1, R_2, \ldots, R_n$ and transmitter T are attached. The transmitter T is spaced a selected distance from 8–25 feet from the nearest receiver $R_1$ and each of the receivers $R_1, R_2, \ldots, R_n$ are preferably spaced at 1 ft intervals. Preferably at least four receivers are provided with the sonde 10. The receivers $R_1, R_2, \ldots, R_n$ having matched gain and phase and the following general characteristics:

(a) be able to withstand relatively high temperatures with respect to their currie temperature;
(b) have a low mechanical impedance; and
(c) have a high sensitivity and broad frequency bandwidth.

The transmitter T can be any commercially available type, such as a magnetostrictive transducer producing acoustic energy having a central frequency frox: 5 to 30 kHz. Connected to the sonde 10 and forming a part of the well logging system A is a well logging subassembly 20 adapted to obtain measures of the borehole fluid density $\rho_f$ and velocity $V_f$, borehole radius or caliper, i.e., the borehole diameter and ellipticity, and formation densities $\rho_r$, as will be more completely described below.

With the well logging system A suspended at selected locations in the borehole 16, transmitter/receiver combinations can be selected upon command from surface control equipment C and the transmitter T can be energized to produce acoustic energy which propagates into the borehole fluid more or less as a compressional pressure wave in the borehole fluid. Commands energizing selected transmitter/receiver pairs are sent down wireline cable 22, supporting the well logging system A in the borehole 16.

Figure 2:
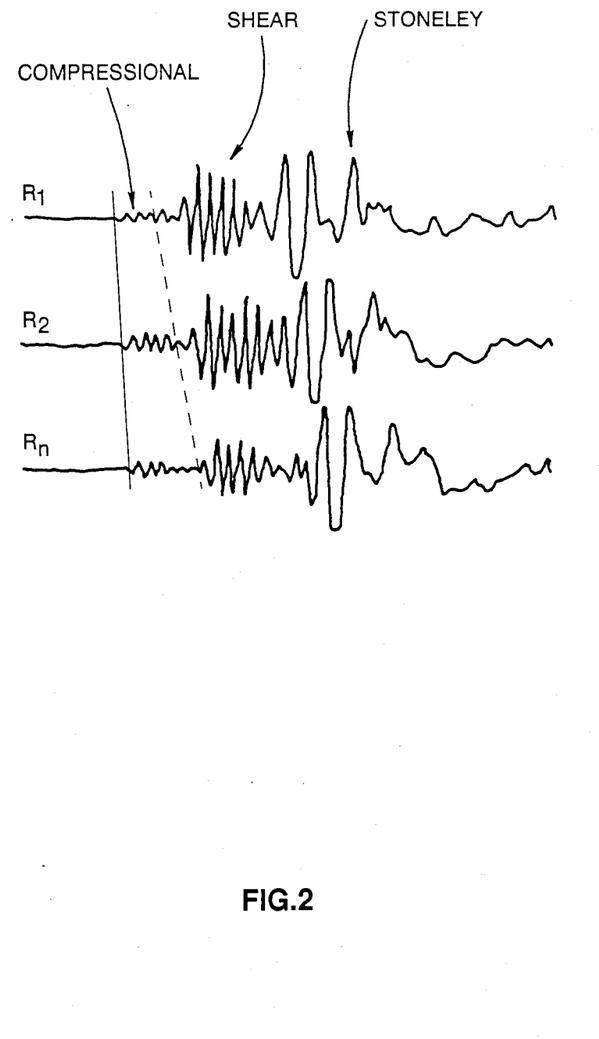
FIG. 2 depicts typical signal waveforms recorded by each of the receivers shown in FIG. 1.

Signals representative of the acoustic waves detected and recorded by each of the receivers $R_1, R_2, \ldots, R_n$ are shown in FIG. 2. The recorded signals are transmitted up cable 22 to the surface control equipment C. The mode of transmission of the recorded signals can either be analog or digital. The surface control equipment C typically includes a central processor/controller 24, a magnetic tape unit 26, a printer 28 and a video display unit 30. The program executing in the processor/controller 24 is responsible for each of the commands to the sonde 10 through cable 22 for selecting transmitter/receiver pairs, for activating transmitter T as well as the ascent and descent of the sonde 10, and for controlling the logging subassembly 20 as will be described below. The upcoming signals from the sonde 10 are processed by a processor/controller 24 and can be recorded using magnetic tape unit 26 or printed using printer 28 or visually displayed using video display unit 30. The preferred program residing within the processor/controller 24 can actually process the signals at the well site during the logging operation using an arrival velocity estimation technique described herein and record the resulting velocity estimates as well as formation impedance and density, and borehole radius, caliper and ellipticity using the printer 28 or tape unit 26. However, such technique is merely exemplary and those skilled in the art will appreciate that other velocity analysis techniques can be used.

When the transmitter T is energized, it emits a burst of acoustic energy having a central frequency from 5 kHz to 30 kHz. This burst of acoustic energy propagates more or less radially outward from the transmitter T as a compressional wave in the borehole fluid 14. As the compressional wave passes into the formation 18, its direction of propagation changes as shown in FIG. 1, and its speed changes to the compressional wave velocity of the specific rock formation composition. At the same time, some of the energy is converted into shear waves propagating in the formation 18 but at a velocity slower than the compressional velocity. In addition, some of the transmitted energy never enters the formation but propagates directly in the fluid as a fluid, wave or mud wave, and other portions of the energy propagate in the form of guided waves such as Stoneley waves or tube waves which propagate along the borehole fluid-formation interface. face.

Returning again to FIG. 2, an illustration of typical signal waveforms recorded, respectively, at receivers $R_1, R_2, \ldots, R_n$ are shown. Three arrivals or events are clearly evident in each of the recorded signals, i.e., a compressional wave arrival, a shear wave arrival, and a Stoneley wave arrival.

Figure 3:
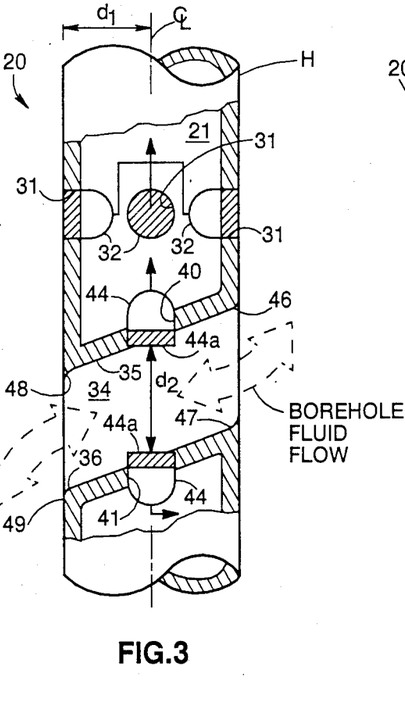
FIG. 3 is a partially cut away view of the acoustic well logging subassembly according to the present invention.
Figure 4:
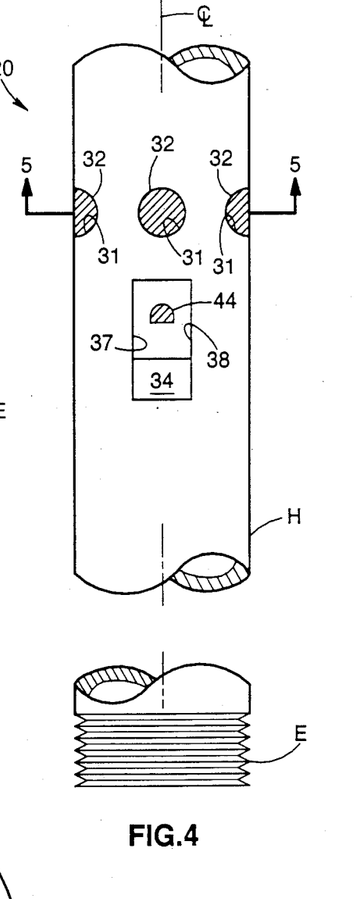
FIG. 4 is a 90° rotated view of the acoustic well logging subassembly shown in FIG. 3.
Figure 5:
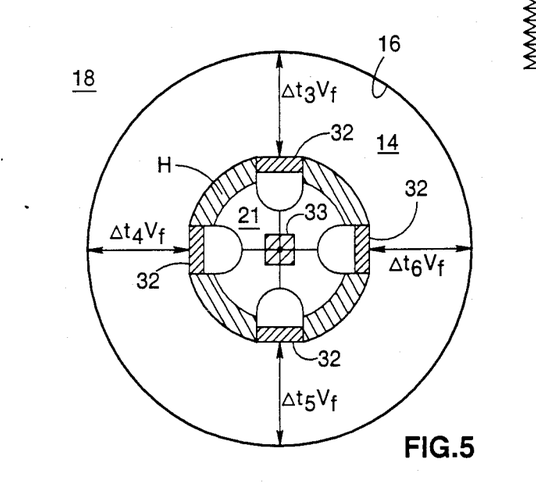
FIG. 5 is a cross-sectional view of the acoustic well logging subassembly of FIG. 4 taken along line 5 as positioned in a borehole.

Looking to FIGS. 3, 4 and 5, a more detailed description of the subassembly 20 adapted to obtain measures of borehole fluid density and velocity, borehole radius or caliper and ellipticity, and formation impedance and density during the logging process will be described. Looking first at FIG. 3, a partial cutaway crosssectional view of the subassembly 20 is depicted. The subassembly 20 comprises a generally cylindrical housing H having an interior cavity 21. Spaced about the circumference of housing H and near one end thereof are a plurality of ports 31 substantially equidistance about the circumference thereof. With the housing H are transceivers 32 securably fastened within the ports 31 each a fixed distance $d_1$ from the center line of the housing H. Each transceiver 32 is preferably a piezoelectric transceiver of the type commercially available having matched gain and phase and a frequency range of 200–500 kHz. The transceivers 32 preferably consists of four fixed arm acoustic echo systems. The transceivers 32 act both as transmitters and receivers. Upon activation, each transmits a pressure wave into the borehole fluid and awaits the return of a reflection from the borehole wall. The operation of each transceiver 32 is controlled by the surface control processor/controller 24 shown in FIG. 1 via cable 22 and an electronics control package 33 mounted within cavity 21 as shown in FIG. 5.

The housing H also includes a transverse flow passageway 34 near an opposite end thereof. As can best be seen in FIGS. 3 and 4, flow passageway 34 comprises a slotted transverse flow path through housing H being formed by interior upper and lower surfaces 35 and 36, and parallel vertical surfaces 37 and 38. A port 40 is provided for in the upper surface 35, and a lower opposed port 41 is provided for in lower surfcce 36. Mounted within the upper port 40 and lower port 41 are transceivers 44. The transceivers 44 include a buffer plate 44a acoustically coupled thereto so as to shield the transceivers 44 themselves from the harsh borehole fluid environment. The transceivers 44 are preferably piezoelectric crystals of the type commercially available having matched, gain and phase characteristics and a frequency range of 200–500 kHz. The operation of the transceivers 44 are controlled by surface processor/controller 24, shown in FIG. 1, via cable 22 and the electronics control package 33 (although not shown connected thereto).

The flow passageway 34 is sized and adapted to direct the flow of the borehole fluid 14 therethrough so as to be in acoustic contact with the transceiver buffer plates 44a such that a measure of both the borehole fluid density and compressional velocity can be obtained. In more particular, the upper end of slotted flow passage way 34 includes arcuate surfaces 46 and 48, while the lower end of the slotted flow passage way 34 includes arcuate surfaces 47 and 49 which are adapted to direct the borehole fluid 14 therethrough while the subassembly 20 is moved either upwardly or downwardly in the borehole 16. Housing H also includes threaded end connectors E at opposite ends thereof (although shown for economy of illustration only at one end) suitable for connecting to the sonde 10 as generally depicted in FIG. 1.

Figure 6:
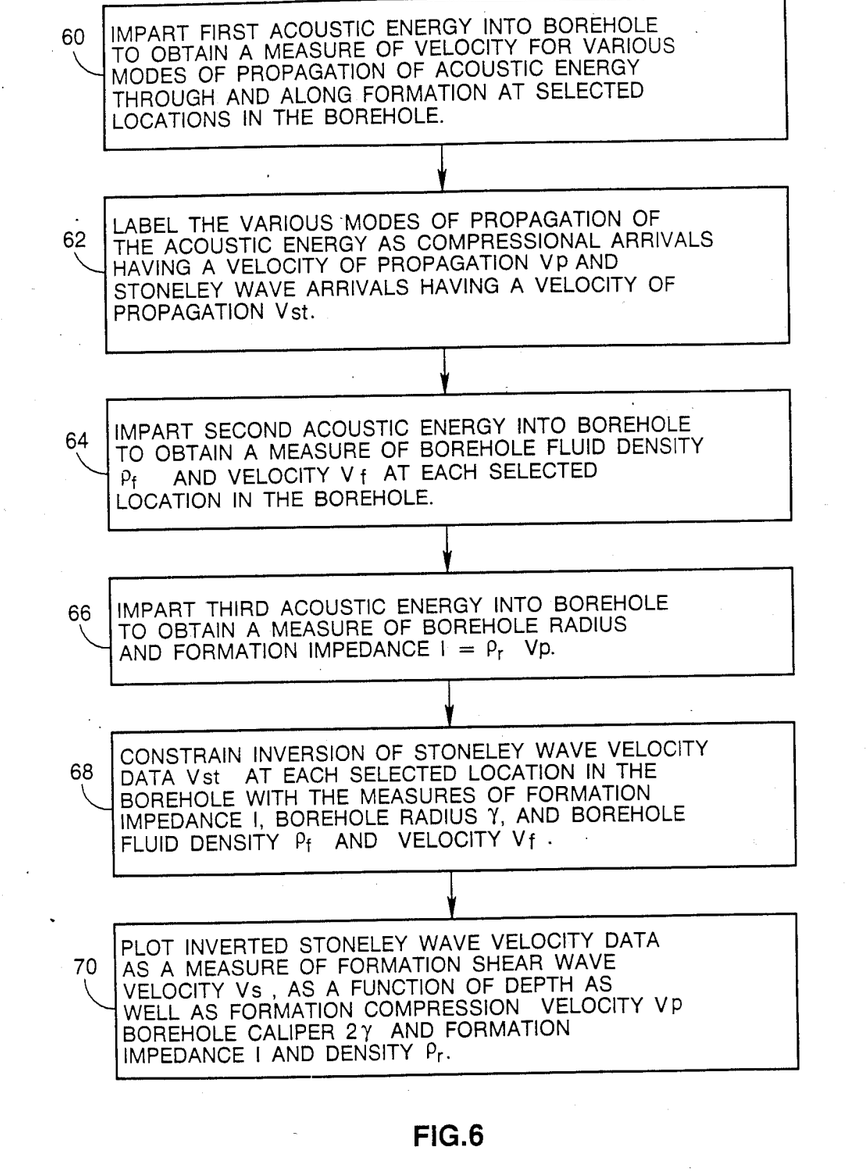
FIG. 6 provides a flow diagram of the method of the present invention.

Looking now to FIG. 6, a generalized flow diagram of the method of the present invention is set forth. In accordance with the present invention, acoustic energy is imparted into the borehole at selected locations by transmitter T and the signal waveforms recorded by receivers $R_1, R_2, \ldots, R_n$ are processed at processor/controller 24 to obtain a measure of the formation compressional wave velocity $V_p$ and Stoneley wave velocity $V_{st}$ at 60. All of this is done in conjunction with the operation of the sonde 10 and processor/controller 24.

Advantageously, although other processing techniques for obtaining arrival velocities are comprehended within the scope of the present invention, the following velocity analysis technique for determining a measure of formation compressional wave velocities $V_p$ and Stoneley wave velocities $V_{st}$ as well as formation shear wave velocities $V_s$ (when present) is particularly advantageous because of its simplicity and arithmetic efficiency. Specifically, at each selected location within the borehole 16, the plurality of signal waveforms are recorded with receivers $R_1, R_2, \ldots R_n$, as shown in FIG. 2. Using a predetermined arrival slowness (i.e., 1/velocity) a selected time window of the signals are processed as though a coherent arrival is present. The output of the processing at this step is an energy number that is large if the data appears to have a coherent arrival at the assumed slowness and small if the data does not appear to have a coherent arrival at the assumed slowness. Accumulation of this energy data from selected portions of the signal can be represented in the form of velocity spectrum and the peaks therefrom can be selected and associated with distinct arrival velocities as will be described later.

A first feature of such processing at 60 is the use of nonlinear Nth root stacking which is very easily handled within a microprocessor to provide enhancement of data. In particular, Nth root stacking is used to enhance event arrivals in a recorded signal by suppressing uncorrelated noise. The second feature is the use of a time window about lines representative of decreasing velocities (or increasing slowness). At the outset it should be noted that because this technique is nonlinear, some distortion of the signal waveform can result.

To illustrate the principle of the Nth root stacking, the following example is provided. In a linear array of receivers contains M elements, one can find the Nth root stack of the recorded signals by first aligning them according to some assumed velocity (or slowness) and then computing:

$$Q_i = \frac{1}{M} \Sigma \text{ sign } (Y_{ij}) (Y_{ij})^{1/N} \text{ and} \quad (1)$$

$$S_i = \text{sign } (Q_i) (Q_i)^N$$

where sign is the positive or negative sense of the quantity in parentheses; and
where $Y_{ij}$ is the amplitude of the signal j at time i;
where $Q_i$ is an intermediate quantity; and
where $S_i$ is the Nth root stacked sample at time i.

The Nth root exponent is usually 4 but any value of between 1 and 20 can be useful. However, for velocity resolution purposes, a higher number is better because it tends to suppress noise. It has been found that an Nth root exponent of 4 provides the best results.

After the Nth root stacking, the effects of the incoherent noise can be greatly reduced over the reduction obtained by simply stacking with an exponent of 1. With the Nth root stacking, all the signals are treated as a vertical array. By stacking windowed portions of the signals data along lines of constant velocities, a point by point spectrum of velocity vs time is built up. For a given receiver array geometry, the resolution of this procedure to some degree is controlled by the exponent N.

Simple linear stacking schemes (such as Nth root stacking with an exponent of N=1) do not produce reliable velocity spectra because these schemes do not adequately penalize a lack of coherence between tracers. Semblance based schemes conversely require large numbers of numerical computations which can be computationally inefficient in small microprocessor based systems.

A first step in processing the recorded signals at 60 to obtain a measure of various arrival velocities is to assume a first value of slowness and for each trial slowness, a theoretical travel time is computed for the transmitter to first and subsequent receiver distances. For such slowness, a time point on each of the signals is computed to define an imaginary line over lying a suite of received signals as depicted by the solid line in FIG. 2. Data windows about each point of the received signals are obtained and subjected to the Nth root stacking process as set forth in Equation (1) above and the summed value $S_i$ can be plotted as a function of the assumed velocity or held in memory. Next, the assumed slowness is incremented to move the assumed time points along the signals as depicted by the dashed line in FIG. 2. As the slowness is decreased, a new slanted window is obtained which is shifted in time to the right as viewed with respect to the signal waveforms depicted in FIG. 2. Thus, the signal waveforms are being scanned for slower velocity coherent arrivals which are detected later in time. In other words, the signals are stacked along a window about a constant velocity line which intersects each of the signals where the slant of the window increases as the velocity decreases and with increasing time from the near receiver.

One of the primary benefits of the Nth root stacking with assumed velocities within a specified time window is that there is no need to advance the windows for a particular slowness down the full length of the signal waveform and then return to another slowness because higher velocities desired for the interpretation purposes are received first. By increasing the assumed slowness, the processing is moving the windows to points on the signal waveforms where coherent arrivals are expected to be detected at such slowness. Therefore, the need for checking the whole signal wave form at other slowness for that particular arrival has been eliminated. After computing the Nth root stacks for a spectrum of slowness values, the data can be displayed in the form of a velocity spectrum, i.e., an energy-weighted distribution of the various assumed slownesses (1/velocity). The surface processor/controller 24 then scans the velocity spectrum for maximum or peaks. The peaks in the velocity spectrum can thence be plotted at printer 26 or stored at tape unit 28 as representing velocity estimates for formations as a function of depth in the borehole 16.

At 62, the processor/controller 24 can then label such peaks or maxima as a particular arrival, i.e., compressional arrivals, shear wave arrivals (if present), and Stoneley wave example, the guidelines set forth by C. V. Kimball and T. L. Marzetta in "Semblance Processing of Borehole Acoustic Array Data," *Geophysics*, Vol. 49, No. 3, March 1984, pages 274–281.

Next, at 64, processor/controller 24 can issue command signals via cable 22 and electronics package 33 to activate one of the transceivers 44 to impart a burst of acoustic energy at selected locations in the borehole which propagates as a compressional wave through the borehole fluid 14 in slotted flow passageway 34 which can be detected at the opposite transceiver 44 and also detected at original transceiver 44 after reflection from the opposite buffer plate 44a. The electronics control package 33 measures the one-way traveltime $\Delta t_1$ for the compressional wave to travel a known distance $d_2$ from the activated transceiver 44 to the other and measures the two-way traveltime $\Delta t_2$ for the compressional wave to travel the known distance $2 \times d_2$ and be reflected back to the activated transceiver 44. The time intervals $\Delta t_1$ and $\Delta t_2$ are then transmitted via cable 22 to processor/controller 24 whereby a measure of the velocity of the compressional wave $V_f$ in a borehole fluid 14 are determined according to:

$$V_f = d_2 \Delta t_2 \text{ or}$$

$$V_f = 2 \times d_2 \Delta t_2$$

Thus, we have two independent measures of borehole fluid velocity. The electronics package 33 also records the amplitude of the reflected signal $A_r$ and the amplitude of the outgoing signal $A_o$. The amplitudes $A_r$ and $A_o$ as well as the recorded signals themselves are then transmitted via cable 22 to processor/controller 24 to determine a measure of the borehole fluid density. Since the buffer plate 44a is of a known and near-constant density $\rho_t$ and velocity $V_t$, one can, after suitable calibrations familiar to those skilled in the art, quantitatively determine the fluid density $\rho_f$ required to match the observed reflected amplitudes according to:

$$\rho_f = \frac{\rho_t V_t}{V_f} \left[ \frac{R_1 + 1}{R_1 - 1} \right] \tag{3}$$

where $R_1 = A_r/A_0$
where $\rho_t$ and $V_t$ are the velocity and density of buffer plates 44a forming an integral part of transceivers 44.

At 66, processor/controller 24 can, either simultaneously with step 64 or after 64, issue a command signal via cable 22 and electronics package 33 whereby transceivers 31 impart acoustic energy at each selected location in borehole 16 which propagates as a compressional wave in a borehole fluid 14. The electronics package 33 is also activated by the processor/controller 24 measures the elapsed time from the initiation of transceivers 32 until the signal has reflected off the wall of the borehole 16 and is detected by transceivers 32, as well as records the outgoing signal amplitude $A_0$ and the reflected signal amplitude $A_R$ as well as the recorded signals and transmits them all to processor/controller 24 for further processing as set forth below. The two-way traveltimes $\Delta t_3$, $\Delta t_4$, $\leftarrow t_5$, and $\Delta t_6$ (as shown in FIG. 5) can provide four independent measures of the borehole radius $r_i$. Since the transceivers 32 are all circumferentially mounted a fixed distance $d_1$ from the center line of subassembly 22, an average of the four time intervals which includes the distance $d_1$ can provide a measure of the average borehole radius according to:

$$\gamma = (r_1 + r_2 + r_3 + r_4)/4 = \sum_{i=1}^{M} \frac{r_i}{M} \tag{4}$$

where:
$r_1 = (d_1 + \Delta t_3 V_f)$
$r_2 = (d_1 + \Delta t_4 V_f)$  M=number of independent measures of radius
$r_3 = (d_1 + \Delta t_5 V_f)$
$r_4 = (d_1 + \Delta t_6 V_f)$ In addition to providing four independent measures of borehole radius $r_i$, the deviation from the mean can provide a measure of borehole ellipticity, i.e., $\gamma - r_i$.

Processor/controller 24 can then determine formation impedance I and density $\rho_r$ by simply neglecting the effects of curvature and scatter due to borehole rugosity according to:

$$I = \rho_f V_f \left[ \frac{R_2 + 1}{R_2 - 1} \right] \tag{5}$$

and $$\rho_r = \frac{\rho_f V_f}{V_p} \left[ \frac{R_2 + 1}{R_2 - 1} \right]$$

Where $R_2 = A_0/A_r$ and where $V_p$=the compressional wave speed in the formation.

Having thus determined all of the values necessary to constrain the inversion of the Stoneley wave velocity data, processor/controller 24 at 68 inverts the Stoneley wave velocity data and obtains a measure of the formation shear velocity. This can be done in the low frequency limit where the wave lengths of the acoustic waves are greater than the borehole diameter according to:

$$V_s = \left[ \frac{\rho_r}{\rho_f} \left( \frac{1}{V_{ST}^2} - \frac{1}{V_f^2} \right) \right]^{-\frac{1}{2}} \tag{6}$$

Thus, the subassembly 20 is quite useful in determining the ukknown parameters needed to constrain the inversion of the Stoneley wave velocity data to obtain a measure of formation shear wave velocity $V_s$. However, to invert the Stoneley is a bit more complicated than one would be led to believe and also requires the borehole radius, which can be obtained above, and subassembly properties must be considered.

Fortunately, the subassembly 20 properties remain fixed. At other frequencies (i.e., wave lengths), equation (6) becomes more complicated and involves bessel functions which bring in the borehole radius dependence, such as set forth by 0. Y. Liu in "Stoneley Wave-Derived $\Delta t$ Shear Log," SPWLA sium, June 10-13, 1984, pages 1-14 and by J. L. Stevens and S. M. Day in "Shear Velocity Logging in Slow Formations Using the Stoneley Wave," Geophysics, Vol. 5, No. 1, January 1986, pages 137-147. At 70, the results of such inversion by the processor/controller 24 can be outputted to tape unit 26 or printer 28 to produce a well log having measures of formation shear $V_s$ and compressional $V_p$ velocities, formation density $\rho_r$ and impedance I, borehole radius $\gamma$ or caliper all as a function of depth in the borehole.

Having thus described a method and system in accordance with the invention for constraining the inversion of Stoneley wave velocity data to obtain more accurate estimates of formation shear wave velocities, the advantages of the invention can be appreciated particularly in those environments where shear waves are highly attenuated, nonpropagated or obscured by noise.

Variations in the specific steps described herein may be adapted while remaining within the scope of the invention as set forth in the following claims. For example, a conventional borehole compensated well logging system can be coupled to the subassembly 20 to determine both formation impedance I and density $\rho_r$. Since conventional pressure wave logging systems merely obtain a measure of formation compressional wave velocity $V_p$, the use of subassembly 20 in conjunction therewith and processor/controller 24, formation impedance I and density $\rho_r$ can be obtained by the use of Equations 2, 3 and 5. Similarly, subassembly 20 can be employed to monitor borehole fluid density $\rho_f$ in the borehole for gas inclusion rather than at the mud pit as a safety precaution or to locate gas-containing formations.

I claim:

1. A system for acoustic well logging of a borehole comprising:
   (a) a logging sonde having acoustic energy transmitter smitter means for imparting first acoustic energy into the borehole and a plurality of acoustic energy receiver means spaced at selected distances from the transmitter means for recording first signals representative of the first acoustic energy whereby measures of Stonely wave velocity and formation compressional wave velocity can be obtained;

(b) a subassembly adapted to be connected with the logging sonde wherein the subassembly includes:

(i) interior surfaces forming a transverse passageway therethrough, wherein the transverse passageway includes arcuate surfaces at opposite ends adapted to direct the flow of boreholefluid therethrough during upward and downward movement of the logging sonde and subassembly in the borehole;

(ii) first transceiver means mounted circumferentially with the subassembly for imparting second acoustic energy into the borehole and recording a second signal representative of the second acoustic energy after reflection from the borehole wall;

(iii) second transceiver means mounted with the subassembly and on opposite interior surfaces of the passageway for imparting third acoustic energy and recording a third signal representative of a third acoustic energy after transmission through the borehole fluid; and (c) processor means for positioning the logging sonde and subassembly at selected locations in the borehole, for controlling the operation of the logging sonde and subassembly, and for processing the first, second and third recorded signals to obtain measures of formation compressional wave velocity $V_p$, Stonely wave velocity $V_{st}$, borehole radius r, formation density $\rho_r$, borehole fluid density $\rho_f$, and borehole fluid velocity $V_f$, so as the constrain strain the inversion of Stonely wave velocity data to obtain a measure of shear wave velocities of formations adjacent the borehole.

2. The system of claim 1 wherein the borehole fluid velocity is determined according to:

$$V_f = \Delta t d_1$$

where:

$\Delta t_1$ = elapsed time between generating and recording the second acoustic wave;

$d_1$ = a fixed distance separating the locations of generating and recording the second acoustic wave.

3. The system of claim 1 wherein the borehole fluid density is determined according to:

$$\rho_f = \frac{\rho_t V_t}{V_f} \frac{R_1 + 1}{R_1 - 1}$$

where $R_1 = A_r/A_o$ $A_o$ = amplitude of generated second acoustic wave $A_r$ = amplitude of recorded second acoustic wave.

4. The system of claim 1 wherein the borehole radius is determined according to:

$$r_i = d_2 + V_f \Delta t_2$$

where:

$d_2$ = a constant $\Delta t_2$ = elapsed time interval between generating and recording the third acoustic wave.

5. The system of claim 4 further including means for determining average borehole radius according to:

$$5\gamma = \sum_{i=1}^{M} \frac{r_i}{M}$$

where: M = the number of separate measures of radius $r_i$.

6. The system of claim 5 further including means for determining borehole ellipticity according to:

$$\text{ellipticity} = \gamma - r_i$$

7. The system of claim 1 wherein the formation density $\rho_r$ determined according to:

$$\rho_r = \frac{\rho_f V_f}{V_p} \frac{R_2 + 1}{R_2 - 1}$$

where:

$R_2 = A_r/A_o$ $A_o$ = amplitude of generated third acoustic wave $A_r$ = amplitude of recorded third acoustic wave.

8. The system of claim 1 further including means for determining formation impedance I according to:

$$I = \rho_f V_f \frac{R_2 + 1}{R_2 - 1}$$

where:

$R_2 = a_r/A_o$ $A_r$ = amplitude of recorded third acoustic wave; and $A_o$ = amplitude of generated third acoustic wave.

9. The system of claim 1 wherein the formation shear wave velocity is determined according to:

$$V_s = \frac{\rho_r}{\rho_r} \left[ \frac{2}{V_{ST}} - \frac{2}{V_f} \right]^{-1}$$

* * * * *

UNITED STATES PATENT OFFICE
CERTIFICATE OF CORRECTION

PATENT NO. : 4,779,236
DATED : October 18, 1988
INVENTOR(S) : Carl H. Sondergeld It is certified that error appears in the above-identified patent and that said Letters Patent is hereby corrected as shown below:

Column 2, line 23, delete " , ".

Column 3, line 24, "conrurrent" should read -- concurrent --;

line 62, "fea-, tures" should read -- features --.

Column 4, line 46, "frox:" should read --from--.

Column 5, line 41, delete "face.";

line 53, "crosssectional" should read --cross-sectional--.

Column 6, line 14, "surfcce" should read --surface--.

Column 8, line 39, "wave example" should read --wave or guided wave arrivals using, for example,--;

line 60, "$V_f$in" should read --$V_f$ in--;

line 63, in line with the equation, at the right margin, insert "(2)".

Column 10, line 68, delete "smitter".

Signed and Sealed this

Fifth Day of September, 1989

Attest:

DONALD J. QUIGG

Attesting Officer

Commissioner of Patents and Trademarks